United States Patent
Li (10) Patent No.: US 12,177,250 B2
(45) Date of Patent: Dec. 24, 2024

(54) ANTI-SPOOFING ATTACK CHECK METHOD, DEVICE, AND SYSTEM

(71) Applicant: HUAWEI TECHNOLOGIES CO., LTD., Shenzhen (CN)

(72) Inventor: Yizhong Li, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 747 days.

(21) Appl. No.: 17/199,882

(22) Filed: Mar. 12, 2021

(65) Prior Publication Data

US 2021/0203695 A1 Jul. 1, 2021

Related U.S. Application Data

(63) Continuation of application No. PCT/CN2019/104706, filed on Sep. 6, 2019.

(30) Foreign Application Priority Data

Sep. 15, 2018 (CN) .......................... 201811077494.8

(51) Int. Cl.
*H04L 9/40* (2022.01)

(52) U.S. Cl.
CPC ...... *H04L 63/1483* (2013.01); *H04L 63/0236* (2013.01); *H04L 63/0876* (2013.01); *H04L 63/1416* (2013.01); *H04L 63/1425* (2013.01)

(58) Field of Classification Search
CPC ............. H04L 63/1483; H04L 63/0876; H04L 63/1416; H04L 63/0236; H04L 63/1425

USPC ....................................................... 726/22
See application file for complete search history.

(56) References Cited

U.S. PATENT DOCUMENTS

| 10,225,234 B2 * | 3/2019 | Nenov ..................... H04L 67/52 |
| 11,057,402 B2 * | 7/2021 | Lim ........................ H04L 69/00 |
| 2003/0161332 A1 * | 8/2003 | Ohno ........................ H04N 7/18 |
| | | 370/402 |

(Continued)

FOREIGN PATENT DOCUMENTS

| CN | 101043442 A | 9/2007 |
| CN | 101170564 A | 4/2008 |

(Continued)

OTHER PUBLICATIONS

Saito et al. "Validating Packet Origin Using External Route Information." Information and Telecommunication Technologies (APSITT), 2010 8th Asia-Pacific Symposium on IEEE. Jun. 15, 2010, 6 pages.

(Continued)

*Primary Examiner* — Teshome Hailu
(74) *Attorney, Agent, or Firm* — Maier & Maier, PLLC (57) ABSTRACT

An anti-spoofing attack check method, including: receiving, by a first network device, a packet via a first interface; determining, by the first network device based on a source IP address of the packet, a first identifier corresponding to the source IP address; determining, by the first network device based on the first interface, a second identifier corresponding to the first interface; and determining, by the first network device, security of the packet based on the first identifier and the second identifier. The method helps prevent misjudgment of the anti-spoofing attack check.

10 Claims, 5 Drawing Sheets

(56) References Cited

U.S. PATENT DOCUMENTS

| | | | | |
|---|---|---|---|---|
| 2011/0030055 A1* | 2/2011 | Balay | ............... | H04L 63/1416 |
| | | | | 726/22 |
| 2014/0355607 A1 | 12/2014 | Seaman-Kossmeyer et al. | | |
| 2016/0094440 A1 | 3/2016 | Huang et al. | | |
| 2018/0063082 A1* | 3/2018 | Nenov | ............... | H04L 63/0236 |
| 2018/0275863 A1* | 9/2018 | Li | ............... | G06F 3/04845 |
| 2019/0007275 A1* | 1/2019 | Clemm | ............... | H04L 63/0421 |
| 2019/0109820 A1* | 4/2019 | Clark | ............... | H04L 9/0861 |

FOREIGN PATENT DOCUMENTS

| | | |
|---|---|---|
| CN | 101945117 A | 1/2011 |
| CN | 103220255 A | 7/2013 |

OTHER PUBLICATIONS

F. Baker et al., "Ingress Filtering for Multihomed Networks", Request for Comments: 3704, Network Working Group, Mar. 2004, total 16 pages.

S. Litkowski et al., "Applying BGP flowspec rules on a specific interface set; draft-ietf-idr-flowspec-interfaceset-03", Routing Area Working Group, Internet-Draft, Mar. 11, 2017, total 15 pages.

* cited by examiner

ANTI-SPOOFING ATTACK CHECK METHOD, DEVICE, AND SYSTEM

CROSS-REFERENCE TO RELATED APPLICATIONS

This application is a continuation of International Application No. PCT/CN2019/104706, filed on Sep. 6, 2019, which claims priority to Chinese Patent Application No. 201811077494.8, filed on Sep. 15, 2018. The disclosures of the aforementioned applications are hereby incorporated by reference in their entireties.

TECHNICAL FIELD

The embodiments relate to the communications field, and in particular, to an anti-spoofing attack check method, a device, and a system.

BACKGROUND

Generally, after receiving a packet, a router on the network obtains a destination address of the packet and searches for a route based on the destination address. If the route is found, the router forwards the packet. Otherwise, the router discards the packet. Therefore, a router does not concern a source address of a packet when forwarding the packet. This provides a loophole for the source address spoofing attack.

Source address spoofing attack is that an intruder fabricates a series of packets with forged source addresses to frequently access a device or host (attacked object) on which the destination address is located, resulting in a specific extent of damage to the attacked object.

Unicast reverse path forwarding (uRPF) is a unicast reverse route search technology used to prevent network attacks that are based on source address spoofing. In uRPF, a source IP address in a data packet is checked, whether traffic is valid is determined based on an interface for receiving the data packet and whether there is a routing entry of the source IP address in a routing table, and then it is determined whether to forward or discard the data packet.

Validity checks of uRPF to a packet source address mainly include a strict check and a loose check. After uRPF in strict mode is configured on an interface, a router queries a source IP address of a packet that enters the interface. If the source IP address of the packet exists in a routing table (which is a normal source IP address route) and an inbound interface of the packet is an outbound interface of the route, the packet is considered valid. Otherwise, the packet is discarded.

However, uRPF in strict mode may cause mistaken discard of packets. Consequently, packet security cannot be accurately identified.

SUMMARY

The anti-spoofing attack check method, device, and system provided in the embodiments help resolve a problem that a unicast reverse path forwarding (uRPF) check in strict mode may cause mistaken discard of packets, thereby improving accuracy of packet security identification.

According to a first aspect, an embodiment provides an anti-spoofing attack check method. According to the method, a first network device receives a packet via a first interface, the first network device determines, based on a source IP address of the packet, a first identifier corresponding to the source IP address; the first network device determines, based on the first interface, a second identifier corresponding to the first interface; and the first network device determines security of the packet based on the first identifier and the second identifier.

The first identifier corresponds to the source IP address, the second identifier corresponds to the first interface for receiving the packet and determines security of the packet based on the first identifier and the second identifier, thereby helping improve accuracy of packet security identification.

In a possible implementation, the first identifier is used to identify an outbound interface set that is of the first network device and that corresponds to a route of the source IP address, and the second identifier is used to identify an interface set in which the first interface is located.

The outbound interface set that corresponds to the route of the source IP address serves as the first identifier, and the interface set in which the first interface is located serves as the second identifier. This identification method is not only applicable to a multi-operator network interconnection scenario, but also applicable to a single-operator network scenario, thereby providing a method with a relatively wide application range and expanding the application range.

In a possible implementation, the first identifier is used to identify a network domain to which a next-hop network device corresponding to a route of the source IP address belongs, and the second identifier is used to identify a network domain to which a neighboring network device connected to the first interface belongs.

The network domain to which the neighboring network device (that is, the next-hop network device) that corresponds to the route of the source IP address belongs serves as the first identifier, and the network domain to which the neighboring network device connected to the first interface belongs serves as the second identifier. This identification method is applicable to a single-operator network scenario, easy to deploy and convenient to plan, thereby improving implementation efficiency.

In a possible implementation, the first network device stores a first correspondence between the source IP address and the first identifier and determines the first identifier based on the source IP address and the first correspondence.

The first correspondence between the source IP address and the first identifier is stored, and is used to determine the first identifier, thereby improving reliability of solution implementation.

In a possible implementation, when the first identifier is the same as the second identifier, the packet is a non-spoofing attack packet; or when the first identifier is different from the second identifier, the packet is a spoofing attack packet.

Whether the packet is a spoofing packet is determined by comparing whether the first identifier is the same as the second identifier, thereby improving determining accuracy.

In a possible implementation, the first correspondence is stored in a routing entry corresponding to the source IP address.

Storing the first correspondence in a routing entry provides a simple and easy-to-use method, thereby improving compatibility and facilitating implementation.

In a possible implementation, before the determining, by the first network device based on the source IP address of the packet, of a first identifier corresponding to the source IP address, the method further includes: obtaining, by the first network device, a routing policy corresponding to the source IP address, where the routing policy indicates the first correspondence between the source IP address and the first identifier; and adding, by the first network device, to the routing entry according to the routing policy, the first identifier corresponding to the source IP address.

The routing policy triggers adding of the first identifier corresponding to the source IP address to the routing entry, thereby improving compatibility of the technology and facilitating implementation.

In a possible implementation, the obtaining, by the first network device, of a routing policy corresponding to the source IP address includes at least one of the following manners: obtaining, by the first network device, the routing policy based on a command line configuration; receiving, by the first network device, a first message from a control management device, where the first message includes the routing policy; and running, by the first network device, algorithm software to automatically generate the routing policy.

Various methods of obtaining a routing policy are provided, thereby enriching manners to implement technologies and improving accessibility.

In a possible implementation, before the determining, by the first network device based on the first interface, a second identifier corresponding to the first interface, the method further includes at least one of the following manners: obtaining, by the first network device, the second correspondence between the first interface and the second identifier based on the command line configuration; receiving, by the first network device, a second message from a control management device, where the second message indicates the second correspondence between the first interface and the second identifier; and running, by the first network device, algorithm software to automatically generate the second correspondence between the first interface and the second identifier.

Various methods of obtaining a second correspondence are provided, thereby enriching manners to implement technologies and improving accessibility.

According to a second aspect, an embodiment provides a message sending method. According to the message sending method, a first message is generated, where the first message indicates a first correspondence between a source IP address and a first identifier; the first message is sent to a first network device; a second message is generated, where the second message indicates a second correspondence between a first interface and a second identifier; and a control management device sends the second message to the first network device.

The first correspondence and the second correspondence are configured by using a message sent by the control management device. In this way, a flexible configuration manner is provided, thereby improving configuration flexibility.

In a possible implementation, the first message and the second message are sent by a same control management device or different control management devices.

Sending the first message or the second message by using a same control management device or different control management devices improves flexibility of solution implementation.

According to a third aspect, an embodiment provides a network device, serving as a first network device. The first network device includes a memory and a processor connected to the memory. The processor is used to execute a computer-readable instruction in the memory, to perform the method according to the first aspect or any possible implementation of the first aspect.

According to a fourth aspect, an embodiment provides a computer-readable medium, including an instruction. When the instruction is run on a computer, the computer is enabled to perform the method according to the first aspect or any possible implementation of the first aspect.

According to a fifth aspect, an embodiment provides a control management device. The control management device includes a memory and a processor connected to the memory. The processor is configured to execute a computer-readable instruction in the memory, to perform the method according to the second aspect or any possible implementation of the second aspect.

According to a sixth aspect, an embodiment provides a computer-readable medium, including an instruction. When the instruction is run on a computer, the computer is enabled to perform the method according to the second aspect or any possible implementation of the second aspect.

According to a seventh aspect, an embodiment provides a system. The system includes the first network device according to the third aspect or the fourth aspect and the control management device according to the fifth aspect or the sixth aspect.

BRIEF DESCRIPTION OF DRAWINGS

To describe solutions in some embodiments or in the prior art more clearly, the following briefly introduces the accompanying drawings for describing the embodiments or the prior art. Further, the accompanying drawings in the following description show merely some embodiments, and a person of ordinary skill in the art may further obtain other drawings based on these accompanying drawings.

DETAILED DESCRIPTION OF THE EMBODIMENTS

Solutions in the embodiments are clearly and completely described in the following with reference to the accompanying drawings. Further, the described embodiments are a part, rather than all, of the embodiments. All other embodiments obtained by a person of ordinary skill in the art based on the embodiments without creative efforts shall fall within the protection scope.

The network architecture and the service scenario described in the embodiments of are intended to describe the solutions more clearly and should not be considered as limiting the solutions provided in the embodiments. A person of ordinary skill in the art may know that, with evolution of network architecture and emergence of new service scenarios, the solutions provided in the embodiments are also applicable to similar problems.

Figure 1:
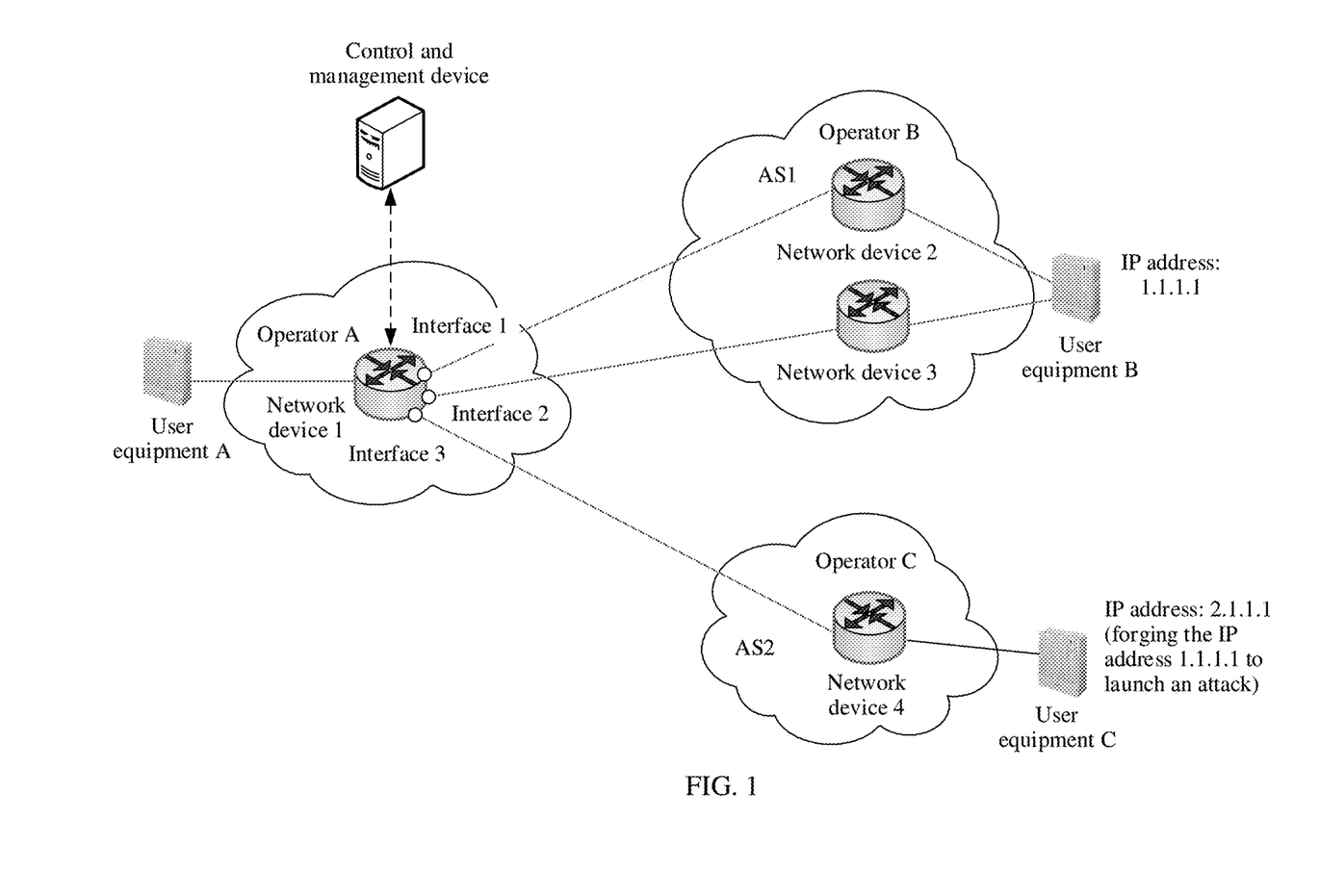
FIG. 1 is a schematic diagram of a network application scenario according to an embodiment.

FIG. 1 is a network schematic diagram of a plurality of reachable paths existing between user equipment A and user equipment B. The network schematic diagram includes network devices 1, 2, 3, and 4, and user equipment A, B, and C. The network device 1 is a network device deployed by an operator A, the network devices 2 and 3 are network devices deployed by an operator B, and the network device 4 is a network device deployed by an operator C. For example, an IP address of the user equipment B is 1.1.1.1, and an IP address of the user equipment C is 2.1.1.1. There are a plurality of reachable paths between the user equipment A and the user equipment B, for example, a path 1: user equipment A—network device 1—network device 2—user equipment B, and a path 2: user equipment A—network device 1—network device 3—user equipment B. A network device between the user equipment A and the user equipment B forwards traffic by using at least two interfaces based on traffic engineering. For example, an interface 1 is used by the network device 1 as an outbound interface to forward a packet from the user equipment A to the user equipment B, and an interface 2 is used as an inbound interface to receive and forward a packet from the user equipment B to the user equipment A. That is, traffic from the user equipment A to the user equipment B is forwarded through the path 1, and traffic from the user equipment B to the user equipment A is forwarded through the path 2. Therefore, a routing table of the network device 1 includes a routing entry indicating that a destination IP address is an IP address/prefix of the user equipment B, and an outbound interface of the routing entry is the interface 1.

An embodiment provides a method for obtaining a first identifier corresponding to a source IP address in a packet and a second identifier on an interface for receiving the packet and determining whether the packet is a spoofing attack packet based on the first identifier and the second identifier.

The method in this embodiment improves accuracy of identifying a spoofing attack packet, and avoids a case in which both a spoofing attack packet and a non-spoofing attack packet are discarded in the prior art because a unicast reverse path forwarding (uRPF) check in strict mode is used on a network device to check a spoofing attack packet, to prevent a network attack behavior that is based on source address spoofing; that is, avoids a problem of mistaken discard of a non-spoofing attack packet, and this problem causes inaccurate determining of packet security. For example, when a plurality of reachable paths exist between the user equipment A and the user equipment B in network, and a router between the user equipment A and the user equipment B uses at least two interfaces to forward traffic based on traffic engineering, a uRPF check in strict mode may cause mistaken discard of a packet. For example, in FIG. 1, the user equipment C forges the IP address 1.1.1.1 of the user equipment B to attack the user equipment A. The network device 1 receives a spoofing packet from the user equipment C through an interface 3. If an inbound interface (the interface 3) is determined to be different from the outbound interface (the interface 1) in the preceding routing entry by using a uRPF check in strict mode, the packet is considered as a spoofing packet and is discarded. Likewise, the network device 1 receives a non-spoofing packet (normal packet) from the user equipment B through the interface 2. If an inbound interface (the interface 2) is determined to be different from the outbound interface (the interface 1) in the foregoing routing entry by using a uRPF check in strict mode, the non-spoofing packet (normal packet) is considered as a spoofing packet, and is discarded by mistake.

The following further describes the embodiments in detail by way of examples based on the application scenario in FIG. 1. A first network device in the following may be the network device 1 in FIG. 1, and a second network device in the following may be the network device 2, the network device 3, or the network device 4 in FIG. 1. The user equipment B is normal user equipment with an IP address 1.1.1.1, and sends a normal packet. The user equipment C is an attacking device with an IP address 2.1.1.1 and forges the IP address (1.1.1.1) of the user equipment B to send an invalid attack packet to the user equipment A. A value carried in a source IP address field in the normal packet or the invalid attack packet (IP packet) is the IP address (1.1.1.1) of the user equipment B, that is, the source IP address is 1.1.1.1.

Figure 2:
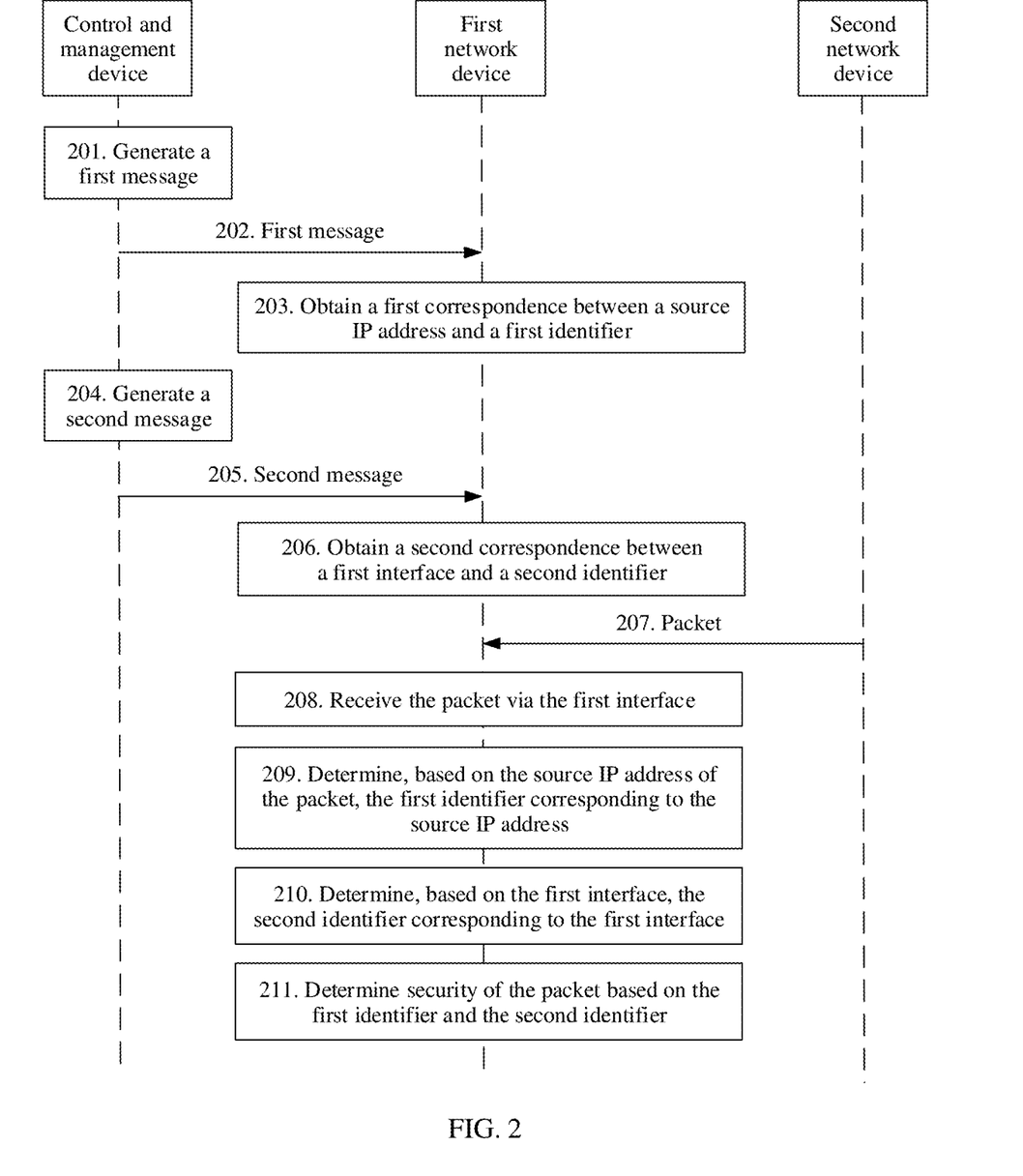
FIG. 2 is a flowchart of an anti-spoofing attack check method according to an embodiment.

FIG. 2 is a schematic flowchart of an anti-spoofing attack method according to an embodiment. The method includes the following content.

201. A control management device generates a first message, where the first message indicates a first correspondence between a source IP address and a first identifier.

202. The control management device sends the first message to a first network device.

203. The first network device obtains the first correspondence between the source IP address and the first identifier.

204. The control management device generates a second message, where the second message indicates a second correspondence between a first interface and a second identifier.

205. The control management device sends the second message to the first network device.

206. The first network device obtains the second correspondence between the first interface and the second identifier.

In an implementation, the first identifier is used to identify an outbound interface set that is of the first network device and that corresponds to a route of the source IP address, and the second identifier is used to identify an interface set in which the first interface is located.

For example, as shown in FIG. 1, a packet from the network device 1 may reach the user equipment B by passing through the interface 1 and the network device 2 or by passing through the interface 2 and the network device 3. That is, on the network device 1, outbound interfaces corresponding to an IP route with a destination IP address 1.1.1.1 are the interface 1 and the interface 2. The interface 1 and the interface 2 constitute an outbound interface set 1, and the outbound interface set 1 is identified by using the first identifier. For example, the first identifier is an identifier 100. Likewise, on the network device 1, an outbound interface corresponding to an IP route with a destination IP address 2.1.1.1 (the IP address of the user equipment C) is the interface 3. The interface 3 also constitutes an outbound interface set 2. For example, the first identifier identifying the outbound interface set 2 is an identifier 300. The network device 1 obtains, by receiving the first message from the control management device, the identifier 100 corresponding to the route with the IP address 1.1.1.1. Likewise, the network device 1 may also obtain an identifier 200 corresponding to the route with the IP address 2.1.1.1.

The network device 1 further configures a corresponding outbound interface set identifier on each interface by receiving the second message from the control management device. That is, the first identifier allowed to take a uRPF check is specified on each interface. For example, the identifier 100 is configured on the interface 1 and the interface 2, and the identifier 200 is configured on the interface 3. In this scenario, the first interface may be the interface 1, the interface 2, or the interface 3. An interface set in which each interface on the network device 1 is located is identified by using the second identifier.

The outbound interface set that corresponds to the route of the source IP address serves as the first identifier, and the interface set in which the first interface is located serves as the second identifier. This identification method is not only applicable to a multi-operator network interconnection scenario, but also applicable to a single-operator network scenario, thereby providing a method with a relatively wide application range and expanding the application range.

In another implementation, the first identifier is used to identify a network domain to which a next-hop network device corresponding to a route of a source IP address belongs, and the second identifier is used to identify a network domain to which a neighboring network device connected to the first interface belongs.

For example, as shown in FIG. 1, a packet from the network device 1 may reach the user equipment B by passing through the interface 1 and the network device 2 or by passing through the interface 2 and the network device 3. Both the network device 2 and the network device 3 belong to a network domain of the operator B. The network domain indicates a network range, which can be identified in a manner such as an autonomous system (AS), a network name, or an operator name, for example, AS1. A packet from the network device 1 may reach the user equipment C by passing through the interface 3 and the network device 4. The network device 4 belongs to a network domain of the operator C, for example, AS2.

From a perspective of the network device 1, the AS1 is a network domain to which next-hop network devices (the network device 2 and the network device 3) corresponding to an IP route with the destination IP address 1.1.1.1 belong. AS2 is a network domain to which a next-hop network device (the network device 4) corresponding to an IP route with the destination IP address 2.1.1.1 belongs. In this example, the first identifier is specifically AS1 or AS2. The network device 1 obtains, by receiving the first message from the control management device, AS1 corresponding to the route with the IP address 1.1.1.1. Likewise, the network device 1 may also obtain AS2 corresponding to the route with the IP address 2.1.1.1.

The network device 1 further configures, by receiving the second message from the control management device, a network domain to which a neighboring network device connected to each interface belongs. That is, the first identifier that is allowed to pass a uRPF check and that is specified respectively on each interface. For example, AS1 is configured on the interface 1 and the interface 2, and AS2 is configured on the interface 3. A network domain to which a neighboring network device connected to each interface on the network device 1 belongs is identified by using the second identifier.

The network domain to which the neighboring network device (that is, the next-hop network device) that corresponds to the route of the source IP address belongs serves as the first identifier, and the network domain to which the neighboring network device connected to the first interface belongs serves as the second identifier. This identification method is applicable to a single-operator network scenario, easy to deploy and convenient to plan, thereby improving implementation efficiency.

It should be noted that the first identifier and the second identifier each indicate one type of identifier, the first identifier indicates the identifier of the outbound interface set corresponding to the IP route or the network domain to which the next-hop network device corresponding to the IP route belongs, and the second identifier indicates a value of the first identifier specifically selected on the interface of the network device.

It should be further noted that the first correspondence between the source IP address and the first identifier may be indicated by a routing policy. Except the foregoing manner of receiving the first message (where the first message includes the routing policy) from the control management device, the first network device may further obtain the routing policy corresponding to the source IP address in at least one of the following manners:

(1) The first network device obtains the routing policy based on a command line configuration. For example, an administrator logs in to the first network device to perform a configuration operation by using a command line.

(2) The first network device runs algorithm software to automatically generate the routing policy.

The routing policy triggers adding of the first identifier corresponding to the source IP address to the routing entry, thereby improving compatibility of the technology and facilitating implementation. Various methods of obtaining a routing policy are provided, thereby enriching manners to implement technologies and improving accessibility. The first correspondence and the second correspondence are configured by using a message sent by the control management device. In this way, a flexible configuration manner is provided, thereby improving configuration flexibility.

It should be further noted that, in addition to the manner of receiving the second message (where the second message indicates the second correspondence between the first interface and the second identifier) from the control management device, the first network device may further obtain the second correspondence between the first interface and the second identifier in at least one of the following manners:

(1) The first network device obtains the second correspondence between the first interface and the second identifier based on a command line configuration. For example, an administrator logs in to the first network device to perform a configuration operation by using a command line.

(2) The first network device runs algorithm software to automatically generate the second correspondence between the first interface and the second identifier.

Various methods of obtaining a second correspondence are provided, thereby enriching manners to implement technologies and improving accessibility.

It should be further noted that the first message and the second message are sent by using a same control management device or different control management devices. The first message and the second message may be sent by using a management channel or may be sent by using a control channel protocol. Currently, a commonly used management channel protocol may be, for example, a simple network management protocol (SNMP) or a network configuration protocol (NETCONF). Currently, a commonly used control channel protocol may be, for example, an OpenFlow protocol, a path computation element communication protocol (PCEP), a border gateway protocol (BGP), or an interface to the routing system (I2RS).

Sending the first message or the second message by using a same control management device or different control management devices improves flexibility of solution implementation.

207. A second network device sends a packet to the first network device, where the packet includes the source IP address, that is, a source IP address field in a packet header of the packet carries the source IP address.

As shown in FIG. 1, when the second network device is the network device 2 or 3, the network device 2 or 3 forwards a packet from the user equipment B, where the source IP address in the packet is a valid IP address 1.1.1.1. When the second network device is the network device 4, the network device 4 forwards a packet from the user equipment C, where the source IP address in the packet is an invalid spoofing IP address 1.1.1.1.

208. The first network device receives the packet via the first interface.

As shown in FIG. 1, the first interface may be the interface 1, the interface 2, or the interface 3.

209. The first network device determines, based on the source IP address of the packet, the first identifier corresponding to the source IP address.

In an implementation, the first network device stores a first correspondence between the source IP address and the first identifier, and the first network device determines the first identifier based on the source IP address and the first correspondence.

The first correspondence may be stored in an independent mapping relationship table or may be stored in a routing entry corresponding to the source IP address. The first correspondence between the source IP address and the first identifier is stored, and is used to determine the first identifier, thereby improving reliability of solution implementation.

When the first correspondence is stored in a routing entry corresponding to the source IP address, before the first network device determines, based on the source IP address of the packet, the first identifier corresponding to the source IP address, the first network device obtains the routing policy corresponding to the source IP address, where the routing policy indicates the first correspondence between the source IP address and the first identifier. The first network device adds, to the routing entry according to the routing policy, the first identifier corresponding to the source IP address.

According to FIG. 1, when the routing policy 1 indicates the first correspondence between the source IP address 1.1.1.1 (the user equipment B) and the first identifier (for example, the identifier 100 or AS1), the network device 1 adds, according to the routing policy 1, the identifier 100 or AS1 to a routing entry corresponding to a destination address 1.1.1.1 in a routing table, as shown in Table 1. When the routing policy 2 indicates the first correspondence between the source IP address 2.1.1.1 (the user equipment C) and the first identifier (for example, the identifier 200 or AS2), the network device 1 adds, according to the routing policy 2, the identifier 200 or AS2 to a routing entry corresponding to the destination address 2.1.1.1 in the routing table, as shown in Table 1. It should be noted that the destination address may be an IP address (for example, 1.1.1.1), or may be an IP address prefix (for example, 1.1.1.1/24). This is merely an example, and should not be considered as limiting. Storing the first correspondence in a routing entry provides a simple easy-to-use method, thereby improving compatibility and facilitating implementation.

TABLE 1

| Destination IP address | Outbound interface | Next hop | First identifier |
| --- | --- | --- | --- |
| 1.1.1.1 | Interface 1 | Network device 2 | Identifier 100 or AS1 |
| 2.1.1.1 | Interface 4 | Network device 4 | Identifier 200 or AS2 |

210. The first network device determines, based on the first interface, the second identifier corresponding to the first interface.

In an implementation, the first network device stores a second correspondence between the first interface and the second identifier, and the first network device determines the second identifier based on the first interface and the second correspondence.

As shown in FIG. 1, the network device 1 stores a correspondence 1 between the interface 1 and the identifier 100 or AS1, a correspondence 2 between the interface 2 and the identifier 100 or AS1, and a correspondence 3 between the interface 3 and the identifier 200 or AS2.

211. The first network device determines security of the packet based on the first identifier and the second identifier.

For example, when the first identifier is the same as the second identifier, the packet is a non-spoofing attack packet; or when the first identifier is different from the second identifier, the packet is a spoofing attack packet.

As shown in FIG. 1, when a packet (where the source IP address is 1.1.1.1) from the user equipment B is received on the interface 1 of the network device 1, the first identifier (an identifier 100 or AS1) corresponding to the source IP address 1.1.1.1 is determined to be the same as the second identifier (an identifier 100 or AS1) corresponding to the interface 1. In this case, the packet is determined as a non-spoofing attack packet, thereby avoiding a case in the prior art in which a normal packet is determined as a spoofing packet by mistake (for details, refer to the foregoing description).

When a spoofing packet (where the source IP address is a spoofing 1.1.1.1) from the user equipment C is received on the interface 3 of the network device 1, the first identifier (the identifier 100 or AS1) corresponding to the source IP address 1.1.1.1 is determined to be different from the second identifier (an identifier 200 or an AS2) corresponding to the interface 3. In this case, the packet is determined as a non-spoofing attack packet, thereby avoiding mistaken determining of a spoofing packet.

Figure 3:
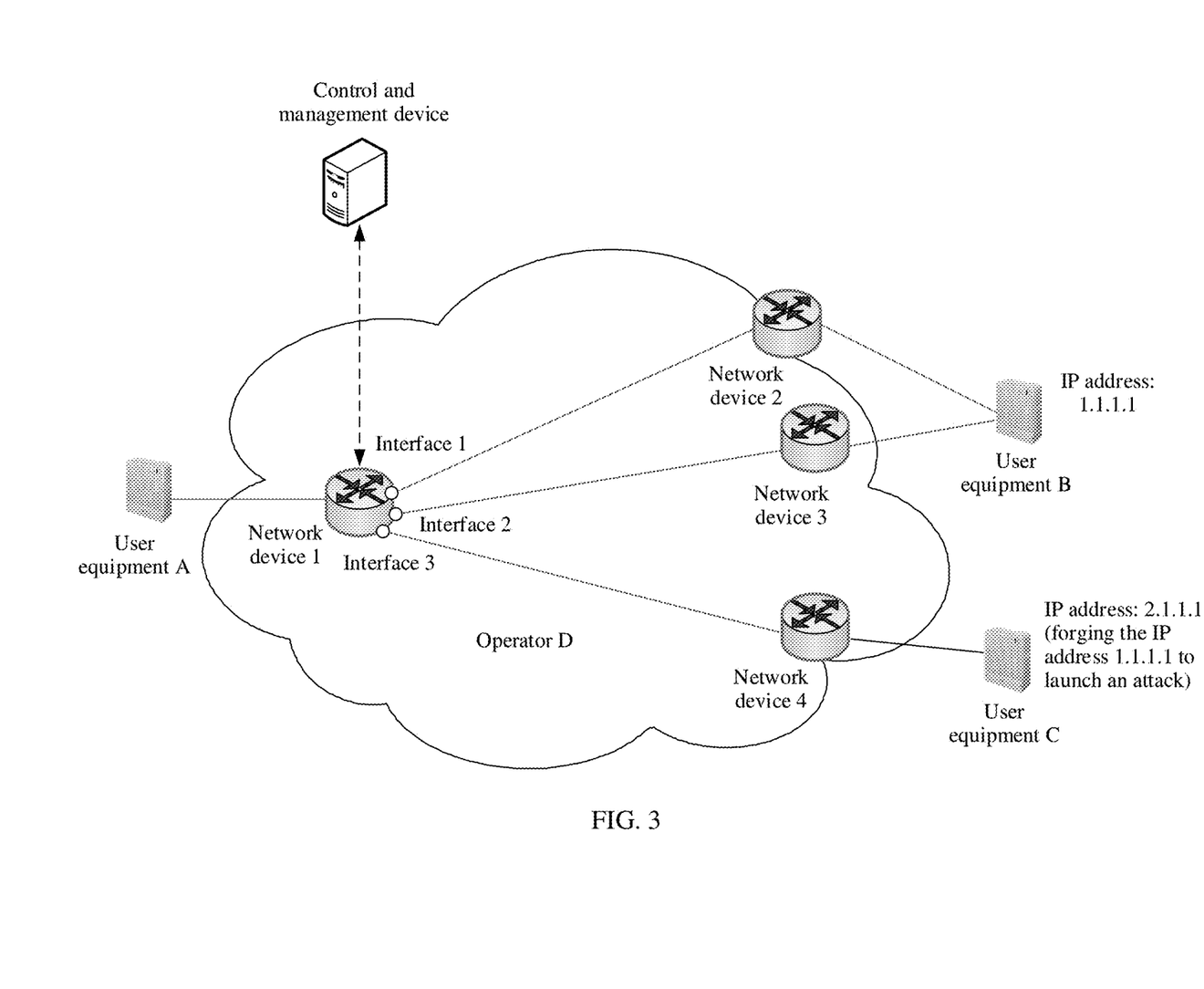
FIG. 3 is a schematic diagram of another network application scenario according to an embodiment.

It should be noted that the embodiments may be applied to a multi-operator network interconnection scenario as shown in FIG. 1 and may be further applied to a single-operator network scenario shown in FIG. 3. The method for implementing an embodiment in the network scenario shown in FIG. 3 is basically the same as that in the embodiment described in FIG. 1. A difference lies in that in the scenario shown in FIG. 3, the first identifier may be used to identify the outbound interface set, but the manner in which the first identifier is used to identify the neighboring network domain is not applicable. Other content is consistent with that in the embodiment shown in FIG. 1. For brevity, details are not described again.

It should be further noted that the network device in the embodiments is a device with a routing and forwarding function, such as a physical switch, a physical router, or a software virtualization technology-based virtual switch (vSwitch) embedded in a physical server, or a virtual router (vRouter). Packets in the embodiments are usually IP packets. The first network device (for example, the network device 1 in FIG. 1 and FIG. 3) in the embodiments is an intersection node or a network device between a normal traffic path (for example, a valid traffic path between the user equipment A and the normal user equipment B in FIG. 1 and FIG. 3) and an attack traffic path (for example, an invalid traffic path between the user equipment A and the attack user equipment C in FIG. 1 and FIG. 3).

Figure 4:
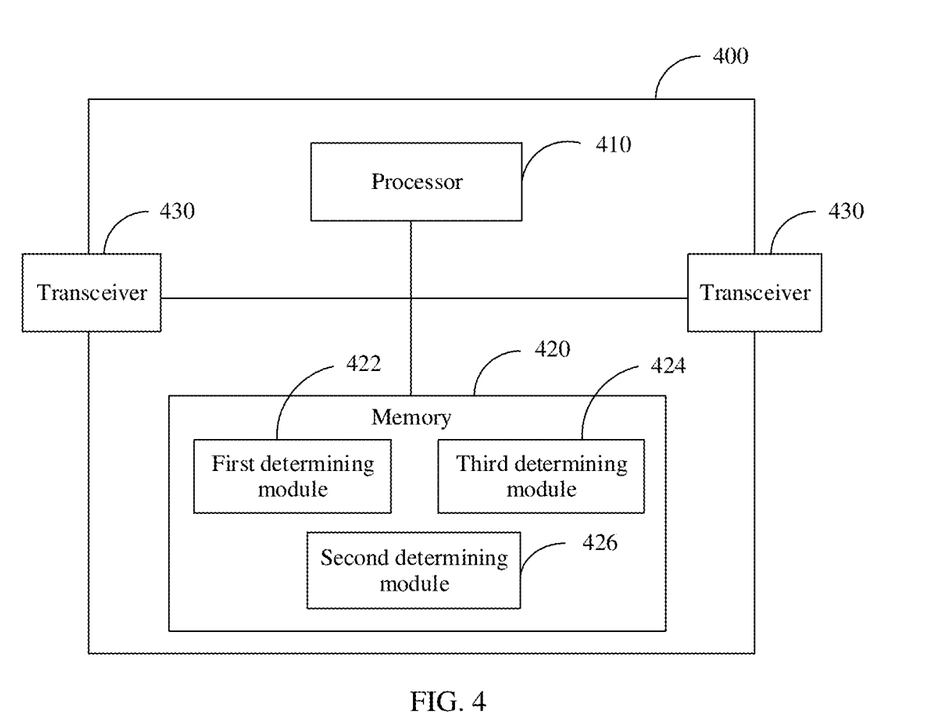
FIG. 4 is a schematic diagram of a network device according to an embodiment.

FIG. 4 is a schematic diagram of a network device 400 according to an embodiment.

As shown in FIG. 4, the network device 400 is used as a first network device, and includes a processor 410, a memory 420 coupled to the processor 410, and a transceiver 430. The first network device 400 may be the network device 1 in FIG. 1 and FIG. 3. The processor 410 may be a central processing unit (CPU), a network processor (NP), or a combination of a CPU and an NP. Alternatively, the processor may be an application-specific integrated circuit (ASIC), a programmable logic device (PLD), or a combination thereof. The foregoing PLD may be a complex programmable logic device (CPLD), a field-programmable gate array (FPGA), generic array logic (GAL), or any combination thereof. The processor 410 may be one processor or may be a plurality of processors. The transceiver 430 is configured to: receive a packet via the first interface and send the packet to the processor 410 for subsequent operation processing. The memory 420 may include a volatile memory such as a random access memory (RAM), or the memory may include a non-volatile memory such as a read-only memory (ROM), a flash memory, a hard disk drive (HDD), or a solid-state drive (SSD). Alternatively, the memory may include a combination of the foregoing types of memories. The memory 420 stores a computer-readable instruction, and the computer-readable instruction includes a plurality of software modules, such as a first determining module 422, a second determining module 424, and a third determining module 426. After executing each software module, the processor 410 may perform a corresponding operation according to an instruction of each software module. In this embodiment, an operation performed by a software module is actually an operation performed by the processor 410 according to an instruction of the software module. The first determining module 422 may be configured to determine, based on a source IP address of the packet, a first identifier corresponding to the source IP address. The second determining module 424 is configured to determine, based on the first interface, a second identifier corresponding to the first interface. The third determining module 426 determines security of the packet based on the first identifier and the second identifier. In addition, after executing the computer-readable instruction in the memory 420, the processor 410 may perform, according to an instruction of the computer-readable instruction, all operations that can be performed by the first network device, for example, operations performed by the first network device (the network device 1) in the embodiments corresponding to FIG. 1, FIG. 2, and FIG. 3.

Figure 5:
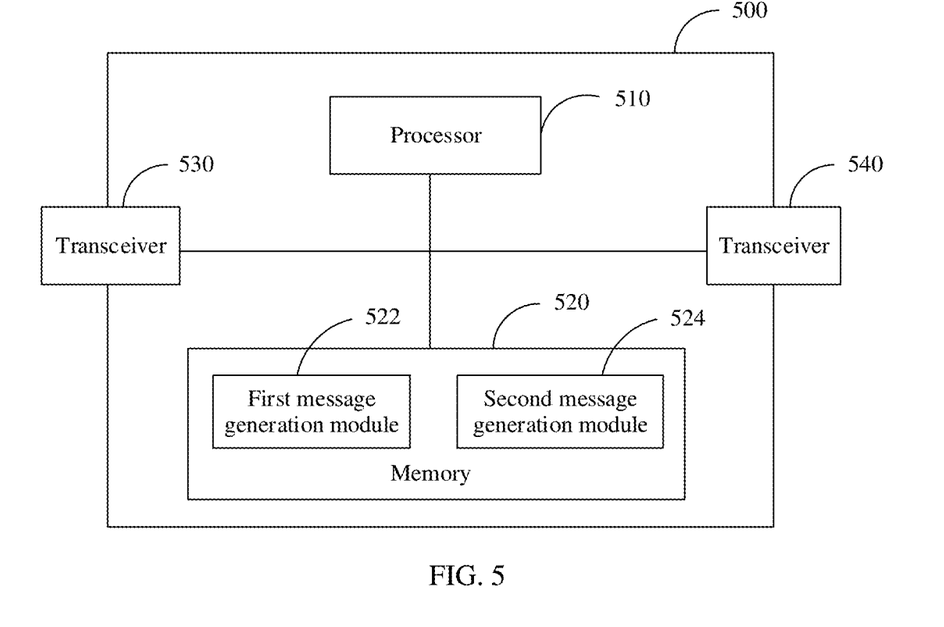
FIG. 5 is a schematic diagram of a control management device according to an embodiment.

FIG. 5 is a schematic diagram of a control management device 500 according to an embodiment.

As shown in FIG. 5, the control management device 500 includes a processor 510, a memory 520 coupled to the processor 510, and a transceiver 530. The control management device 500 may be a control management device in FIG. 1, FIG. 2, and FIG. 3. The processor 510 may be a CPU, an NP, or a combination of a CPU and an NP. Alternatively, the processor may be an ASIC, a PLD, or a combination thereof. The foregoing PLD may be a CPLD, an FPGA, GAL, or any combination thereof. The processor 510 may be one processor, or may be a plurality of processors. The memory 520 may include a volatile memory such as a RAM, or the memory may include a non-volatile memory, such as a ROM, a flash memory, an HDD, or an SSD. Alternatively, the memory may include a combination of the foregoing types of memories. The memory 520 stores a computer-readable instruction, and the computer-readable instruction includes a plurality of software modules, for example, a first message generation module 522 and a second message generation module 524. After executing each software module, the processor 510 may perform a corresponding operation according to an instruction of each software module. In this embodiment, an operation performed by a software module is actually an operation performed by the processor 510 according to an instruction of the software module. The first message generation module 522 is configured to generate a first message, where the first message indicates a first correspondence between a source IP address and a first identifier. The second message generation module 524 is configured to generate a second message, where the second message indicates a second correspondence between a first interface and a second identifier. The transceiver 530 is configured to send the first message and/or the second message to a first network device. For example, when the computer-readable instruction includes the first message generation module 522, the transceiver 530 is configured to send the first message to the first network device. When the computer-readable instruction includes the second message generation module 524, the transceiver 530 is configured to send the second message to the first network device according to an instruction of the processor 510. When the computer-readable instruction includes the first message generation module 522 and the second message generation module 524, the transceiver 530 is configured to send the first message and the second message to the first network device according to an instruction of the processor 510. In addition, after executing the computer-readable instruction in the memory 520, the processor 510 may perform, according to an instruction of the computer-readable instruction, all operations that can be performed by the control management device, such as operations performed by the control management device in the embodiments corresponding to FIG. 1, FIG. 2, and FIG. 3.

Figure 6:
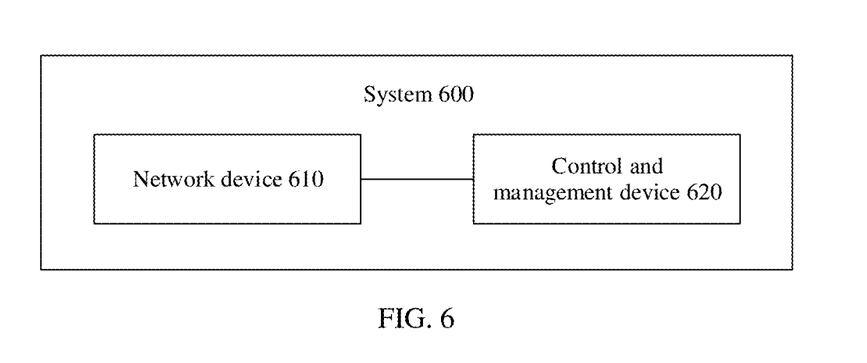
FIG. 6 is a schematic diagram of a system according to an embodiment.

As shown in FIG. 6, a system 600 includes a network device 610 and a control management device 620. The network device 610 is the network device in FIG. 4, and the control management device 620 is the control management device in FIG. 5. For detailed descriptions of the devices in the system, refer to the foregoing related chapters in FIG. 4, FIG. 5, and the like. Details are not described herein again.

It should be understood that a person of ordinary skill in the art can obtain, on a basis of reading about the embodiments, combinations of optional features, steps, or methods described in the embodiments, and all of the combinations belong to the embodiments. For the sake of brevity, different combinations are not described herein.

It should be understood that the term "and/or" describes only an association relationship for describing associated objects and represents that three relationships may exist. For example, A and/or B may represent the following three cases: only A exists, both A and B exist, and only B exists. In addition, the character "/" generally indicates an "or" relationship between two associated objects.

It should be understood that sequence numbers of the foregoing processes do not mean execution sequences in the embodiments. The execution sequences of each process should be determined based on functions and internal logic thereof, and should not be construed as any limitation on implementation processes of the embodiments.

The foregoing descriptions are merely examples of implementation manners, but are not intended as limiting. Any variation or replacement readily figured out by a person of ordinary skill in the art within the scope of the embodiments shall fall within the protection scope.

What is claimed is:

1. An anti-spoofing attack check method, comprising:
receiving, by a first network device, a packet via a first interface;
determining, by the first network device based on a source Internet Protocol (IP) address of the packet, a first identifier associated with the packet and corresponding to the source IP address of the packet;
determining, by the first network device based on the first interface, a second identifier associated with the packet and corresponding to the first interface through which the packet was received; and
determining, by the first network device, security of the packet based on a comparison between the first identifier and the second identifier, and determining a result of an anti-spoofing attack check based on a determined security of the packet,
wherein the first network device stores a first correspondence between the source IP address and the first identifier and determines the first identifier based on the source IP address and the first correspondence, wherein the first correspondence is stored in a routing entry corresponding to the source IP address;
wherein before the determining, by the first network device based on the source IP address of the packet, of the first identifier corresponding to the source IP address, the method further comprises:
obtaining, by the first network device, a routing policy corresponding to the source IP address, wherein the routing policy indicates the first correspondence between the source IP address and the first identifier; and
adding, by the first network device to the routing entry according to the routing policy, the first identifier corresponding to the source IP address.

2. The method according to claim 1, wherein the first identifier is used to identify an outbound interface set that is of the first network device and that corresponds to a route of the source IP address, and the second identifier is used to identify an interface set in which the first interface is located.

3. The method according to claim 1, wherein the first identifier is used to identify a network domain to which a next-hop network device corresponding to a route of the source IP address belongs, and the second identifier is used to identify a network domain to which a neighboring network device connected to the first interface belongs.

4. The method according to claim 1, wherein the first network device stores a second correspondence between the first interface and the second identifier and determines the second identifier based on the first interface and the second correspondence.

5. The method according to claim 1, wherein
when the first identifier is the same as the second identifier, the packet is a non-spoofing attack packet; or
when the first identifier is different from the second identifier, the packet is a spoofing attack packet.

6. A network device, serving as a first network device, the network device comprising:
a non-transitory memory; and
a processor connected to the memory, wherein the processor is configured to execute a computer-readable instruction in the memory to perform the following operations:
receive a packet via a first interface;
determine, based on a source IP address of the packet, a first identifier associated with the packet corresponding to the source IP address of the packet;
determine, based on the first interface, a second identifier associated with the packet corresponding to the first interface through which the packet was received; and
determine security of the packet based on a comparison between the first identifier and the second identifier, and determine a result of an anti-spoofing attack check based on a determined security of the packet,
wherein the memory stores a first correspondence between the source IP address and the first identifier, and the processor is configured to determine the first identifier based on the source IP address and the first correspondence, wherein the first correspondence is stored in a routing entry corresponding to the source IP address;
wherein before determining, based on the source IP address of the packet, the first identifier corresponding to the source IP address, the processor is further configured to:
obtain a routing policy corresponding to the source IP address, wherein the routing policy indicates the first correspondence between the source IP address and the first identifier; and
add, to the routing entry according to the routing policy, the first identifier corresponding to the source IP address.

7. The first network device according to claim 6, wherein the first identifier is used to identify an outbound interface set that is of the first network device and that corresponds to a route of the source IP address, and the second identifier is used to identify an interface set in which the first interface is located.

8. The first network device according to claim 6, wherein the first identifier is used to identify a network domain to which a next-hop network device corresponding to a route of the source IP address belongs, and the second identifier is used to identify a network domain to which a neighboring network device connected to the first interface belongs.

9. The first network device according to claim 6, wherein the memory stores a second correspondence between the first interface and the second identifier, and the processor determines the second identifier based on the first interface and the second correspondence.

10. The first network device according to claim 6, wherein
when the first identifier is the same as the second identifier, the packet is a non-spoofing attack packet; or
when the first identifier is different from the second identifier, the packet is a spoofing attack packet.

* * * * *